(12) United States Patent
Kaufman et al.

(10) Patent No.: US 10,956,435 B2
(45) Date of Patent: Mar. 23, 2021

(54) GLOBAL SEARCH

(71) Applicant: ServiceNow, Inc., Santa Clara, CA (US)

(72) Inventors: Scott Kaufman, San Diego, CA (US); Christopher Tucker, San Diego, CA (US); Andreas Kirn, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 484 days.

(21) Appl. No.: 15/588,427

(22) Filed: May 5, 2017

(65) Prior Publication Data

US 2018/0322169 A1 Nov. 8, 2018

(51) Int. Cl.
| | | |
|---|---|---|
| *G06F 16/24* | (2019.01) | |
| *G06F 16/248* | (2019.01) | |
| *H04L 29/08* | (2006.01) | |
| *G06F 16/2455* | (2019.01) | |
| *H04L 29/14* | (2006.01) | |
| *G06F 16/242* | (2019.01) | |

(52) U.S. Cl.
CPC ........ *G06F 16/248* (2019.01); *G06F 16/2445* (2019.01); *G06F 16/2455* (2019.01); *H04L 67/02* (2013.01); *H04L 67/36* (2013.01); *H04L 69/40* (2013.01)

(58) Field of Classification Search
CPC .................................................... G06F 16/245
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,493,400 B2 | 2/2009 | Loaiza et al. |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |

(Continued)

*Primary Examiner* — Mohammad S Rostami
(74) *Attorney, Agent, or Firm* — Fletcher Yoder PC

(57) ABSTRACT

Systems and methods for providing search results from large amounts of data and providing navigation within search results are disclosed. A global search across a large number of tables within a cloud infrastructure may return large amounts of data from many different sets of possibly related tables and may take a noticeable time to complete processing. Disclosed techniques provide for iterative searching of table groups (e.g., groups of related tables possibly based on expected content of those tables) and providing results incrementally, possibly based on a priority associated with each table group. Further, results may be displayed in a display format that provides the user with context of where (e.g., in which groups) matching results were obtained.

20 Claims, 12 Drawing Sheets

(56) References Cited

U.S. PATENT DOCUMENTS

| | | | |
|---|---|---|---|
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 9,015,188 B2 | 4/2015 | Behne |
| 9,037,536 B2 | 4/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2006/0047721 A1* | 3/2006 | Narang .................. G06F 16/27 |
| 2007/0067329 A1* | 3/2007 | Kamvar ............... G06F 16/951 |
| 2008/0313277 A1* | 12/2008 | Altberg ................. G06Q 30/02 |
| | | 709/204 |
| 2010/0088310 A1* | 4/2010 | Daugherty ........ G06F 16/90335 |
| | | 707/722 |
| 2011/0055231 A1* | 3/2011 | Huck .................. G06F 16/2453 |
| | | 707/751 |
| 2012/0019732 A1* | 1/2012 | Lee .................... H04N 21/4312 |
| | | 348/732 |
| 2015/0254346 A1* | 9/2015 | Chang ................. G06F 16/9535 |
| | | 707/706 |
| 2016/0004780 A1* | 1/2016 | Kruglick .............. G06F 16/957 |
| | | 707/722 |
| 2016/0147888 A1* | 5/2016 | Nguyen .............. G06F 16/2471 |
| | | 707/707 |
| 2017/0046366 A1* | 2/2017 | Rahman .................. H04W 4/70 |
| 2017/0083588 A1* | 3/2017 | Lang .................. G06F 16/2471 |
| 2017/0206034 A1* | 7/2017 | Fetik ..................... G06F 3/0653 |
| 2017/0235848 A1* | 8/2017 | Van Dusen ............. H04L 41/04 |
| | | 705/12 |
| 2018/0060395 A1* | 3/2018 | Pathak .................. G06F 9/5022 |
| 2018/0098114 A1* | 4/2018 | Stevens ............. H04N 21/2665 |
| 2018/0121426 A1* | 5/2018 | Barsness .................. G06F 9/50 |
| 2018/0191454 A1* | 7/2018 | Furuskog ............. H04L 5/0053 |

\* cited by examiner

GLOBAL SEARCH

TECHNICAL FIELD

Embodiments described herein generally relate to cloud computing and in particular disclosed embodiments relate to providing search results across potentially vast amounts of data from disparate tables in a manner allowing for a better user experience. Items returned in response to a query may be displayed in priority order, using customizable presentation templates, and with generated navigational panels to improve user navigation through potentially large amounts of matching results.

BACKGROUND ART

Cloud computing relates to the sharing of computing resources that are generally accessed via the Internet. In particular, cloud computing infrastructure allows users to access a shared pool of computing resources, such as servers, storage devices, networks, applications, and/or other computing based services. By doing so, users, such as individuals and/or enterprises, are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, users may be asked to deal with ever increasing amounts of data collected. The amount of data collected in today's cloud computing solutions may be orders of magnitude greater than was historically available. Users tasked with automating business, IT, and/or other organization-related functions (e.g., incident tracking (help desk)) may be required to navigate ever increasing amounts of data to properly and efficiently perform their job functions. As a result, search response times and organization of query results continue to be potential areas of improvement for software developers and application vendors. The following embodiments address improvements to presentation of search results to address at least these and other issues relating to searches across potentially large data sets to provide an enhanced user experience.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed below.

In one embodiment, a cloud-based computer system includes a memory partition; and a network interface communicatively coupled to one or more processing units and the memory partition, wherein the memory partition includes computer instructions that when executed by the one or more processing units cause the cloud-based computer system to: receive a search request, via the network interface, from a client application, the search request indicating a query string; determine a plurality of table groupings, each table grouping having a relative priority amongst the plurality of table groupings, the plurality of table groupings associated with a client instance, the client instance executing in the cloud-based computer system and communicatively coupled to the client application; obtain results, using a search engine configured to execute in the client instance, of a first search from a first of the plurality of table groupings, the search based on the query string, the first of the plurality of table groupings having a higher priority than any other of the plurality of table groupings not yet searched; and send, via the network interface, to the client application at least a portion of the obtained results of the first search prior to sending results of a second search from a second of the plurality of table groupings.

In another embodiment, a client computer system includes a memory partition; a user interface configured to receive from and present information to an end-user, the user interface communicatively coupled to one or more processing units; and a network interface communicatively coupled to the one or more processing units and the memory partition, wherein the memory partition includes computer instructions that when executed by the one or more processing units cause the client computer system to: execute a client application communicatively coupled, via the network interface, to a client instance executing in a cloud-based computer system; receive a search request at the client application, the search request indicating a query string; obtain information identifying a plurality of table groupings having a priority indication relative to each other; send the search request and the obtained information to the client instance; receive a first portion of search results from the client instance, the first portion of search results representing information obtained from a completed search of all tables within a first table group, the first table group having a priority at least equal to the highest priority of all table groups within the plurality of table groupings; display, on the user interface, information pertaining to the first portion of search results; and receive a second portion of search results from the client instance after display of the first portion of search results, the second portion of search results representing information obtained from a completed search of all tables within a second table group, the second table group having a priority lower than the priority of the first table group.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
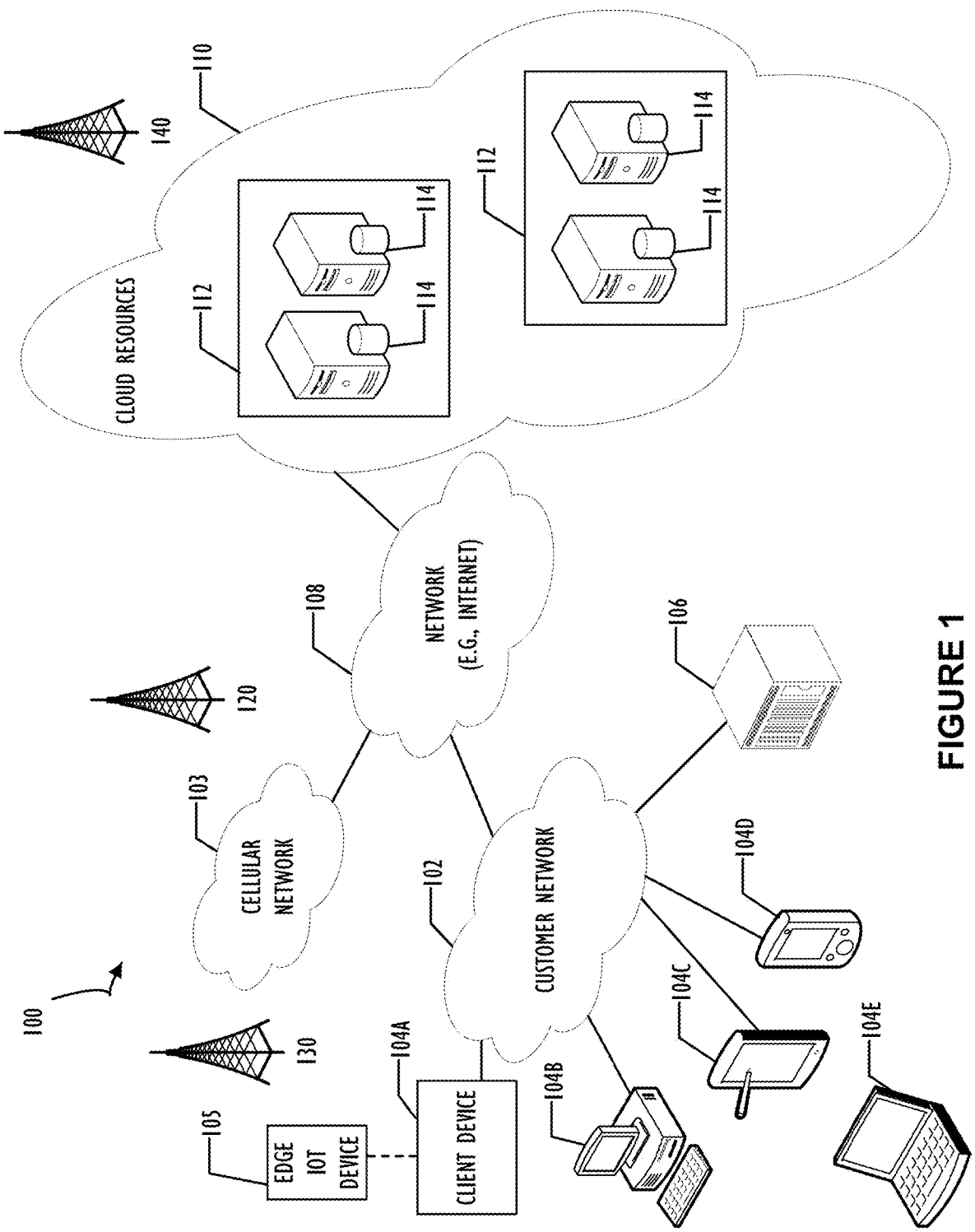
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the terms "search" and "query" may be used interchangeably to refer to processing a set of data for matching results based on information (e.g., strings, parameters, wildcards, and Boolean operators) provided as input. The set of data to be search may be from any number of data stores including but not limited to, text files, database tables, knowledge bases, relational databases, etc.

As used herein, the term "search group" refers to a grouping of one or more tables that will be associated with each other at least for the duration of a search. The term "tables" as used in this context represents database tables, knowledge bases, or other data stores such as a configuration management data base (CMDB). Accordingly, a search group can be thought of as a grouping of data stores to be searched together (i.e., as a group). As explained further below, search groups may be assigned a priority relative to each other to further control the execution and results availability of a query (e.g., global search).

Various example embodiments are disclosed herein that allow end-users to receive and navigate search results. Search groups may be pre-defined, user defined, or determined automatically by the system. For example, search groups may be automatically determined by the system by forming a search group based on previous search results. Search queries represent strings to be matched and may include search parameters (also referred to as search operators) to further refine the search criteria. For example, a Boolean "NOT" operator may be used to eliminate portions of search results such that they contain one string and do not contain the string associated with the "NOT" operator. In general, search strings are used to find files (or tables) and their content, database information, and web pages. A search string may include keywords, numeric data and operators. Stop words (frequently used words such as the) may not be indexed and are sometimes ignored in search queries. However, some search engines allow them to be considered in search through an inclusion operator, such as a plus sign appended to the front of the word. Operators are search commands (often entered in capital letters) that are used to refine searches. Wildcard characters or meta matching characters, for example, represent one or more other characters or a word. The most commonly used wildcard characters are the asterisk (*), which may represent zero or more characters and the question mark (?), which represents a single word. In some cases, parentheses "0" indicate that the enclosed terms are to be searched for first. Boolean operators allow one to specify words for inclusion and exclusion of terms and phrases in search results. For example, "apples NOT oranges" will include results with the string "apples" but exclude those with the string "oranges." Proximity operators may be used to specify distance of two terms on the page as a requirement for returning a result. W(5), for example will limit results to pages in which the two terms are within five words of each other. Multiple operators can be combined to fine-tune a search query. Other options exist (and the examples here may be changed) depending on the implementation criteria of the search engine and, if applicable, indexing criteria.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi (ID networks (Wi-Fi is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge TOT device 105) that may be configured to send and receive information via a network to access cloud computing services or interact with a remote web browser application (e.g., to receive configuration information). FIG. 1 also illustrates that customer network 102 includes a local compute resource 106 that may include a server, access point, router, or other device configured to provide for local computational resources and/or facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a first customer instance may be configured with a client side application interface such as, for example, a web browser executing on a client device (e.g., one of client devices 104A-E of FIG. 1). In this example, an end-user may interact with the web browser to request a search across a plurality of data stores to find information matching a provided search string. To improve end-user experience, the search engine (e.g., search engine 320 of FIG. 3) may obtain information about a grouping of tables, and potentially other user preference settings, from the plurality of data stores such that a priority may be applied to obtaining results to present to the end-user via the web browser interface. As discussed briefly above, searching through a large amount of data may not produce instantaneous results and thus impact the end-user experience. Accordingly, according to disclosed embodiments the search process may be divided and prioritized with results of different iterations being provided to the end-user's web browser at the end of each iteration rather than waiting for the entire search across the complete set of tables to complete. Further, navigation panes may be presented within the web browser interface to allow end-users to navigate through search results. In some cases, the information in the navigation panes may be automatically generated and organized based on the prioritized table groupings. Details of this will be discussed below with reference to FIGS. 3-6.

Figure 2:
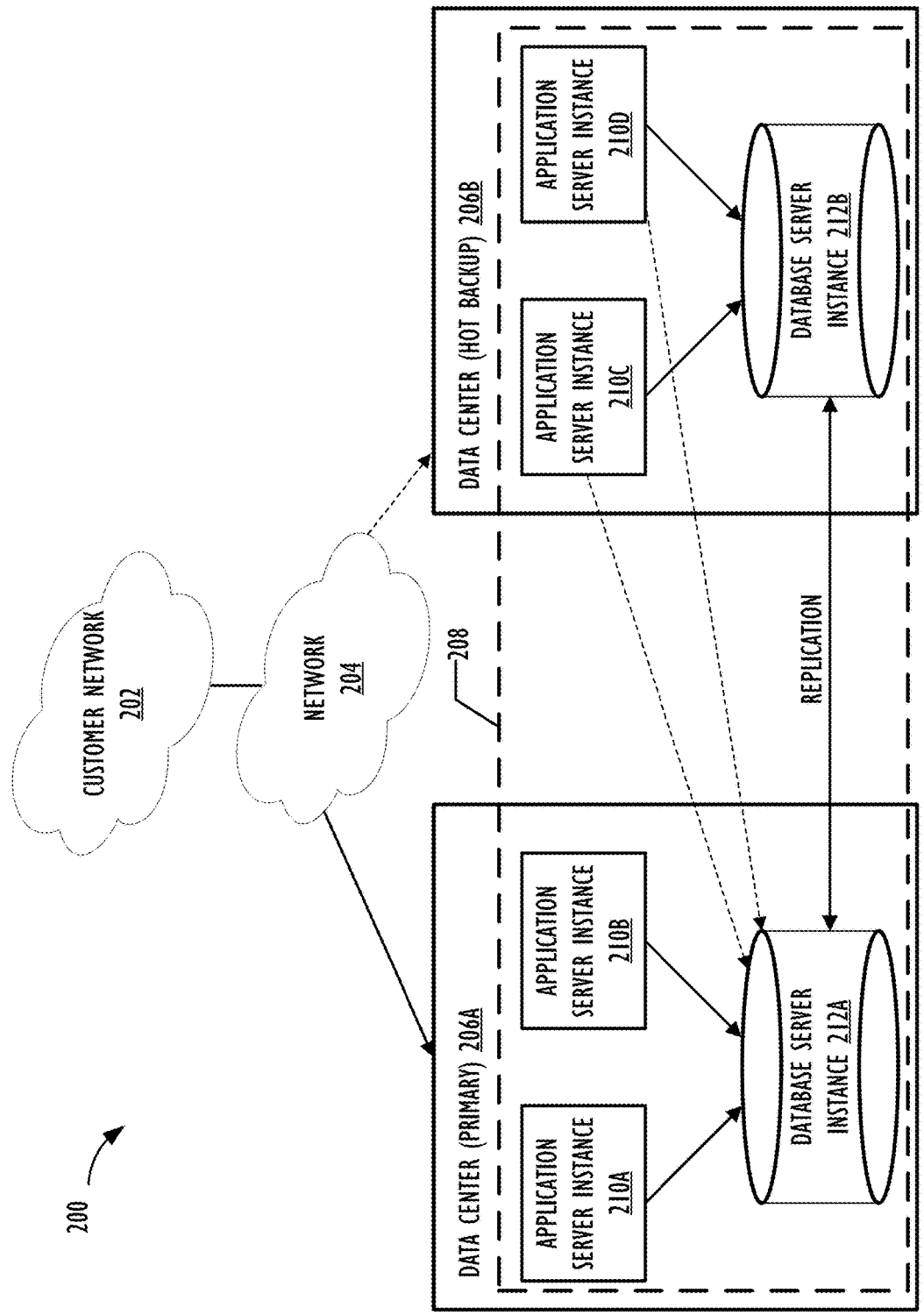
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within cloud resources platform/network 110. Using FIG. 2 as an example, a customer instance 208 is composed of four dedicated application server instances 210a-210d and two dedicated database server instances 212a and 212b. Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, application server instances 210a-210d and database server instances 212a and 212b are shown to be allocated to two different data centers 206a and 206b, where one of data centers 206 may act as a backup data center. In reference to FIG. 2, data center 206a acts as a primary data center that includes a primary pair of application server instances 210a and 210b and primary database server instance 212a for customer instance 208, and data center 206b acts as a secondary data center to back up primary data center 206a for a customer instance 208. To back up primary data center 206a for customer instance 208, secondary data center 206 includes a secondary pair of application server instances 210c and 210d and a secondary database server instance 212b. Primary database server instance 212a is able to replicate data to secondary database server instance 212b. As shown in FIG. 2, primary database server instance 212a replicates data to secondary database server instance 212b using a replication operation such as, for example, a Master-Master MySQL Binlog replication operation. The replication of data between data centers could be implemented in real time or by implementing full backup weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if application server instances 210a and 210b and/or primary data server instance 212a fails and/or is under maintenance, data traffic for customer instances 208 can be diverted to secondary application server instances 210c and 210d and secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/ network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only examples to facilitate ease of description and explanation.

Figure 3:
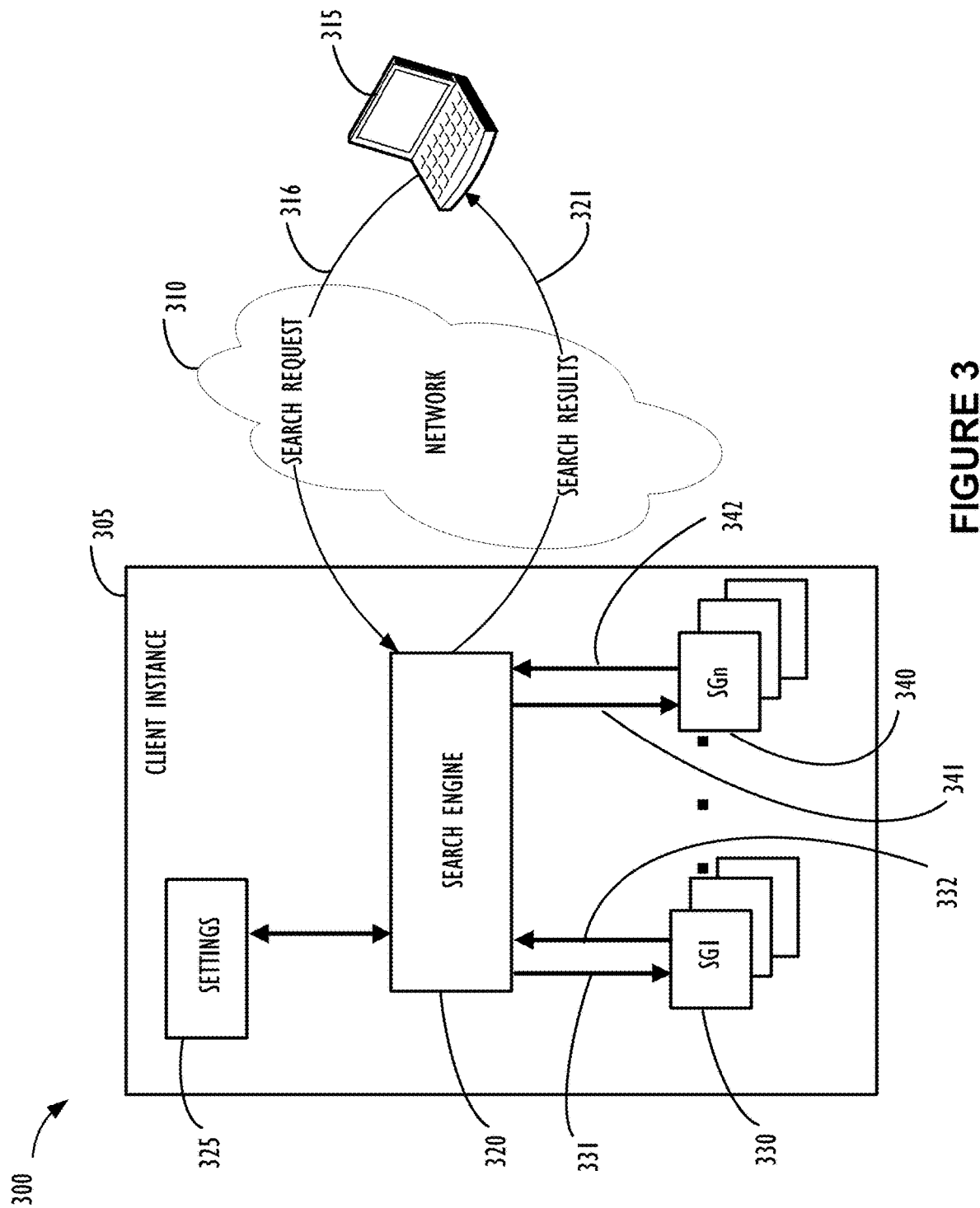
FIG. 3 illustrates a block diagram 300 of components and interactions of those components according to an embodiment of the present disclosure.

FIG. 3 illustrates a block diagram 300 of an embodiment of a network environment and hosted client instance 305 that may be used to support the improved global search according to some disclosed embodiments. As illustrated in FIG. 3, network 310 is a further example of a network such as the Internet or one or more corporate networks such as network 108 of FIG. 1 and network 204 of FIG. 2. In this example, network 310 may represent a single network or a combination of networks that may be configured to transmit search request 316 from client device 315 to search engine 320 and return search results 321 from search engine 320 to client device 315. Client device 315 may be configured to communicate through network 310 with client instance 305 that may be hosted on a remote server or a remote server instance in a cloud infrastructure as described above. In this example, client device 315 may be configured to execute a web browser interface and receive a user indication of a search request 316 to be transmitted to client instance 305 and search engine 320 within that client instance 305 for processing. Search engine 320 may receive search request 316 and obtain informational settings 325 from within client instance 325 pertaining to the processing of search request 316. Alternatively, settings may be embedded within search request 316 without the need to reference settings 325. Once search engine 320 has obtained a sufficient amount of information pertaining to search request 316 the search process may be initiated as shown by interface lines 331, 332 to and from the tables of search group 1 (SG1) 330 and iterating through search groups until finally searching the tables of search group n (SGn) 340 as shown by interface lines 341 and 342. FIG. 3 also shows a plurality of search groups beginning with SG1 330 and ending at SGn 340, however, any number of search groups may be defined. Search groups also may be further defined to have a priority order amongst the groups to set the order of processing of the different groups relative to each other. For example, a database containing recent problem resolution sets may be set as search group 1 at a higher priority than a database containing historical problem resolution sets (set as search group 1) which may in turn be set at a higher priority than a database containing general problem resolution information (set as search group 3). In this manner, the priority of search groups may represent a potential relevancy of information needed by a help desk to support real-time problem resolution (e.g., when a customer is waiting on a call with a help desk agent). The example priorities set here may reflect a belief that more recent issues may help to more quickly resolve a support call. These priorities may be defined as part of search request 316 set in an ad-hoc manner by the end-user on client device 315 or may be stored in a corporate wide pre-defined manner using stored settings 325. Alternatively, a combination of user-defined and pre-defined priorities may be determined at search request 316 processing time by automatically merging two sets of priority settings. In any case, search engine 320 may be configured to process search request 316 by first searching table groups (e.g., SG1 330) prior to searching lower priority table groups in an iterative fashion. Search results 321 may be sent to client device 315 and displayed in the end-user web browser at the end of each search group rather than waiting for a completion of the entire search across all groups. At least in part because search results 321 are sent in portions, end-users of client devices (e.g., 315) may receive actionable results more quickly without having to wait for all potential results to be found and returned.

Block diagram 300 illustrates an example of a portion of a service provider cloud infrastructure (e.g., cloud resources 110 of FIG. 1) connected via a network 310 such as the Internet to a customer device 315 to provide a user interface to network applications, executing within a client instance 305, via a web browser as an example. Network 310 is a further example of a network such as network 108 of FIG. 1 and network 204 of FIG. 2. Details of these networks are discussed above with reference to each of FIGS. 1 and 2 and are not discussed further here. Service provider cloud infrastructure client instance 305 illustrates cloud resources and server instances similar to those explained with respect to FIG. 2 but illustrated here to show support for a search capability within a single client instance 305. Of course, cloud provider infrastructure may be configured to support a plurality of end-user devices such as end-user device 315 concurrently, each in communication with the single client instance 305. Also, cloud provider infrastructures may be configured to support any number of client instances such as client instance 305 concurrently with each of them in communication with one or more end-user devices. As mentioned above, an end-user may interface with client instance 305 using a web browser type application and one example interface is discussed in more detail with respect to the discussion of FIGS. 5-6 below.

Figure 4A:
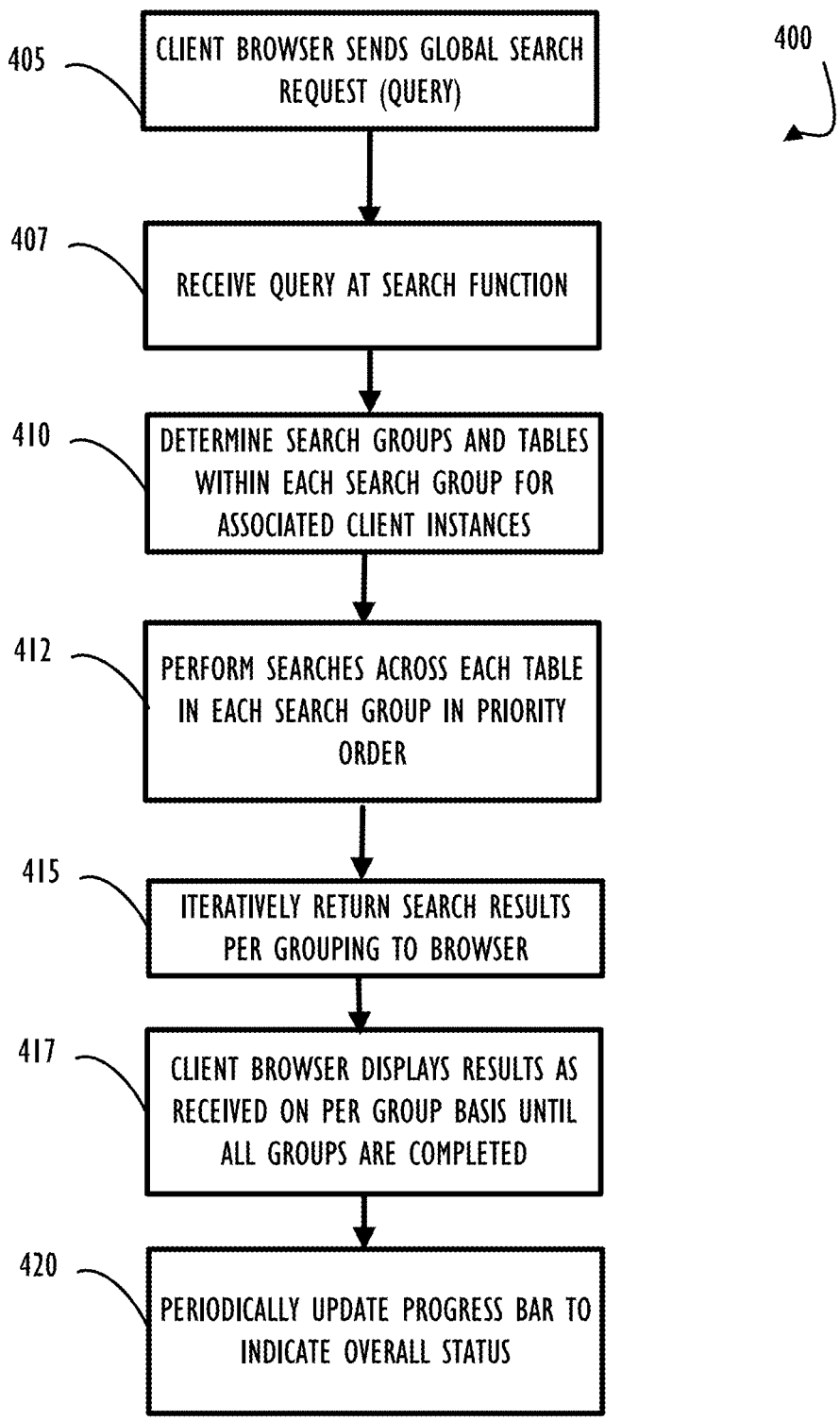
FIGS. 4A-F illustrate different possible flows for performing methods of searching across a plurality of prioritized table groups according to one or more disclosed embodiments.
Figure 4B:
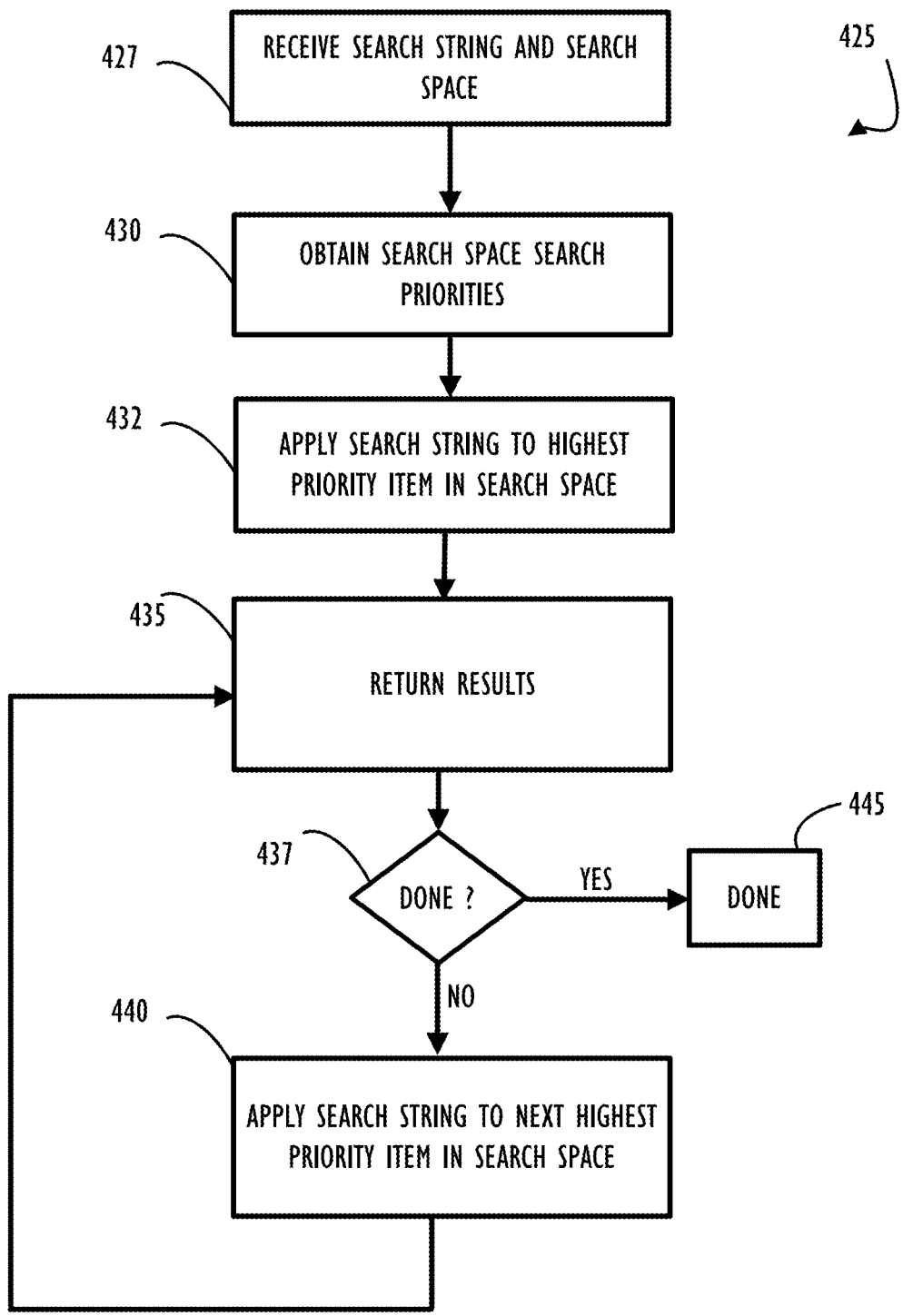
Figure 4C:
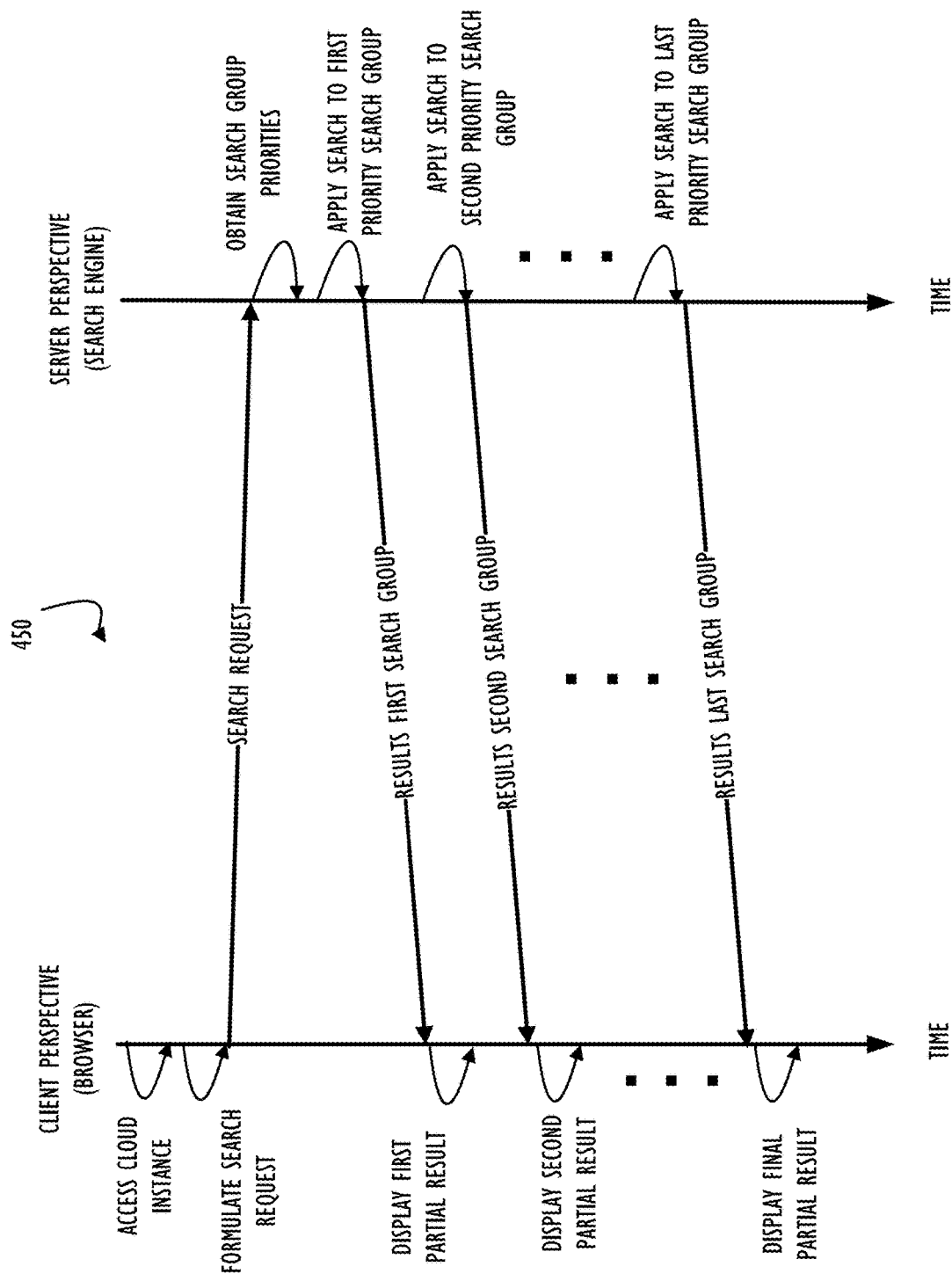

Referring now to FIGS. 4A-C, which illustrate an embodiment where search groups and search priorities are determined on the server side. FIG. 4A illustrates a method 400 an overall flow of an embodiment of this disclosure, FIG. 4B illustrates a method 425 of a one possible flow from the perspective of search engine 320, and FIG. 4C illustrates a possible timeline of events for client device 315 and its interaction with search engine 320. FIG. 4A illustrates in method 400 one possible overall flow for initiating, receiving, processing, and providing results for a query across a plurality of prioritized search groups according to one or more disclosed embodiments. Beginning at block 405, a client browser sends a global search request (query) across a network toward a search engine. The search request may include a search string and additional information regarding preferences and groupings for the prioritized search. Information based on organization of a user interface may be used to assist in automatically determining search priorities as well as predefined groupings and priorities. One possible user interface and how its organization may contribute to prioritization and groupings is discussed below with respect to FIGS. 5-6. Block 407 indicates that a query and other optional grouping or prioritization information is received at a search function, for example, search engine 320 of FIG. 3. At block 410, it is determined at the search function how to group and prioritize the processing of the received query. For example, information included with the search query may be extracted and merged with pre-defined search settings in order to determine processing priorities. Alternatively, only one of pre-defined settings (e.g., settings 325 of FIG. 3) or information received from the client device at the time of the search request may be used to determine the processing priorities and groupings. In one example, a search function may determine what (what information) and how (priority based on placement) a web browser at a particular client device is currently configured to display information to determine processing priorities and groupings. In one example, current attributes of the web browser may be determined (e.g., preferences, current configuration, etc.), at the client instance (e.g., 305 of FIG. 3), by associating a search request (e.g., search request 316 of FIG. 3) with a web browser of the requesting client device (e.g., client device 315 of FIG. 3) and looking up information available in the client instance that pertains to that web browser at the time the request was made. At block 412, the search processing may be performed iteratively by searching each table in each search group with the order of search groups being based on each of the search group's respective priorities. Block 415 indicates that as each iteration of a search completes (e.g., search completes for a search group), results of that iteration may be returned to the client device for processing rather than waiting for all searches across all search groups to complete. Block 417 indicates that a client device web browser may process and display results on a per-search group basis and update the display as necessary until the search completes processing the lowest priority search group. Block 420 indicates that an indication of overall progress may be presented at the client device along with iterative results to provide an indication of overall search progress. Aspects regarding display of information associated with the disclosed method 400 will be discussed in more detail below with reference to FIG. 5.

FIG. 4B illustrates method 425 of a one possible flow from the perspective of search engine 320. Beginning at block 427 a search string and search space (e.g., the tables and areas to be searched) is received. Flow continues to block 430 where priorities of searching each search space are obtained. Next, at block 432 the search string is applied to the highest priority item in the identified search space. Note, the item may be a table from a data base, a knowledge base, or other repository of information to be searched. At block 435, results from the highest priority search are returned. Flow continues to decision 437 where it is determined if the search is complete. If yes, flow continues to block 445 and processing stops, otherwise (NO prong of decision 437) flow continues to block 440 where the search string is applied to the next highest priority item in the search space. This iterative flow continues until all search space items are searched with results being returned at each priority transition. FIG. 4C illustrates a timeline 450 indicating activity from each of the client perspective and the server perspective.

Figure 4D:
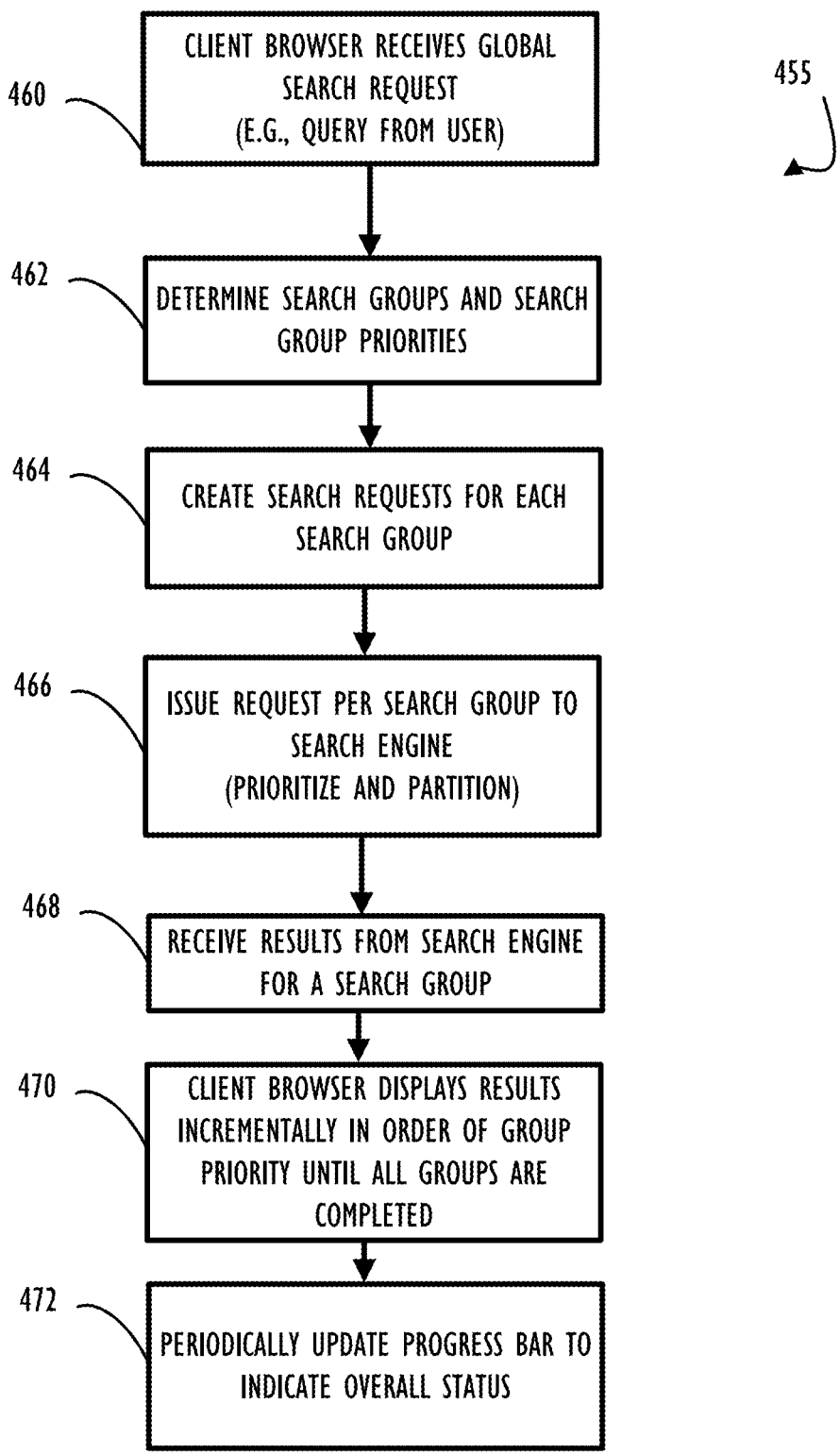
Figure 4E:
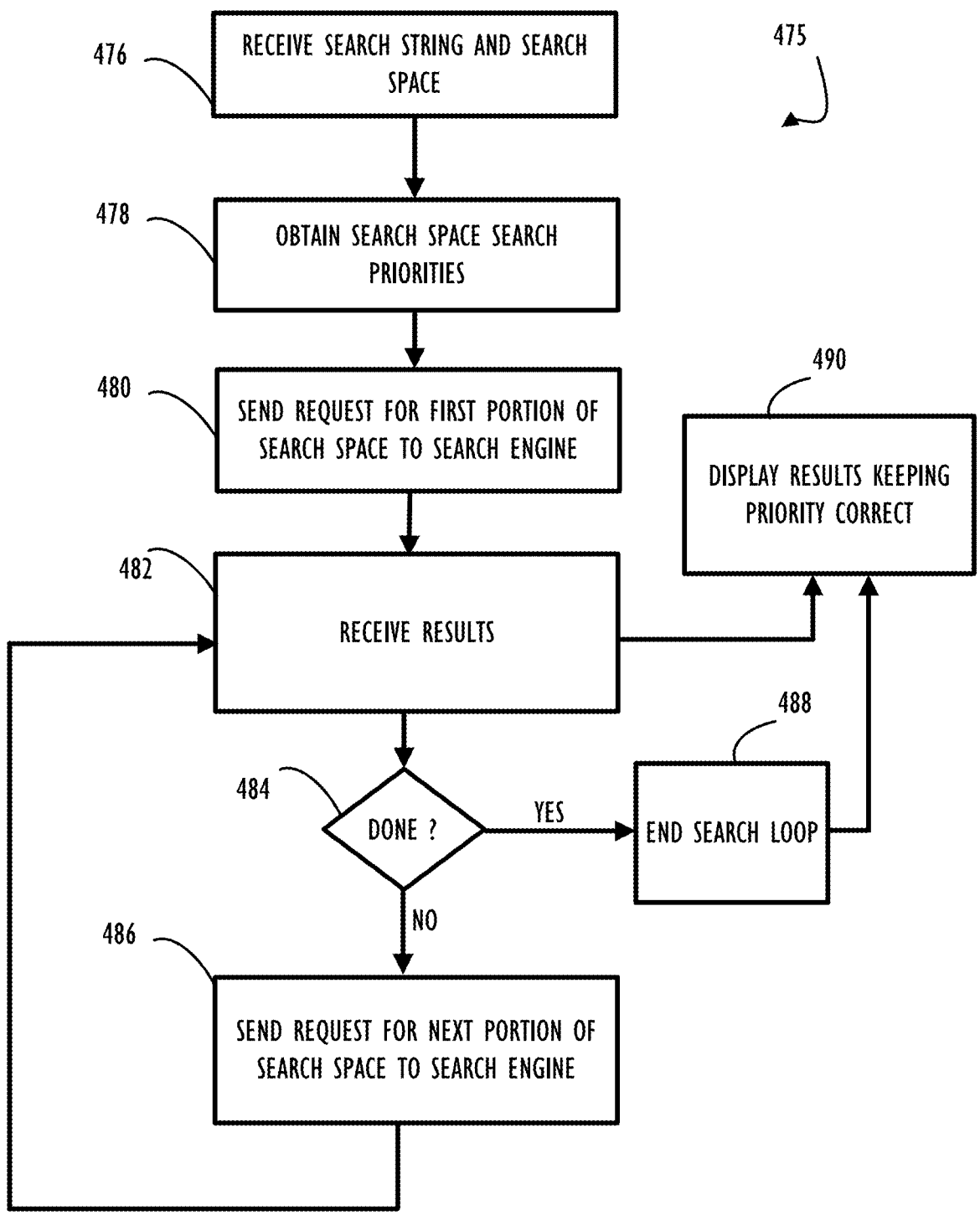
Figure 4F:
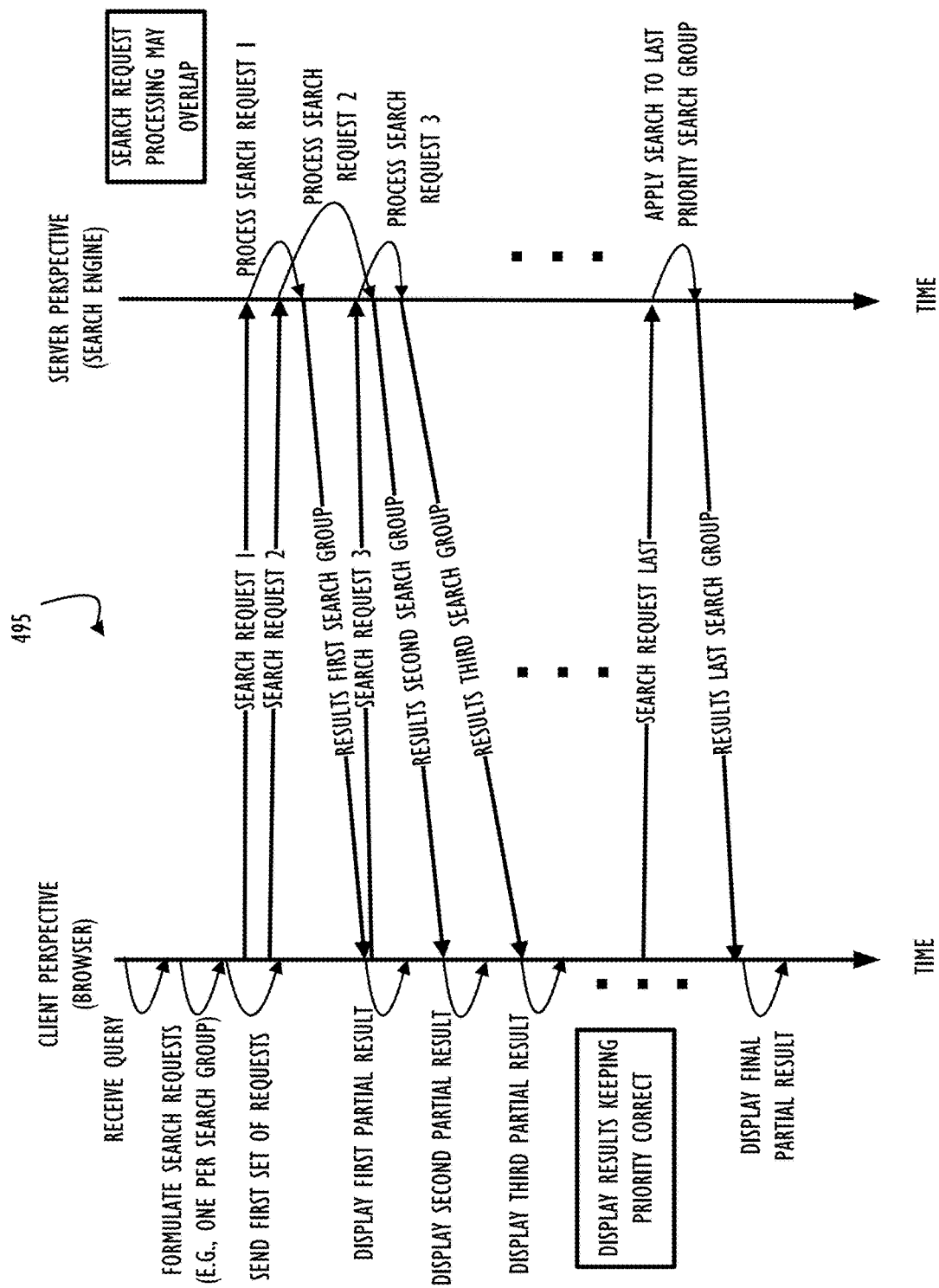

Referring now to FIGS. 4D-F, which illustrate an embodiment where search groups and search priorities are determined on the client side. FIG. 4D illustrates a method 455 an overall flow of an embodiment of this disclosure where search groups and search group priorities are determined primarily on the client side, FIG. 4E illustrates a method 475 of a one possible flow from the perspective of a client side where search engine 320 processes a request per search group, and FIG. 4F illustrates a possible timeline of events for client device 315 and its interaction with search engine 320. FIG. 4D illustrates in method 455 one possible overall flow for initiating, receiving, processing, and providing results for a query across a plurality of prioritized search groups according to one or more disclosed embodiments. Beginning at block 460, a client browser receives a global search request (query) to be partitioned and prioritized as a plurality of discrete requests to be sent across a network toward a search engine. The search request may include a search string and additional information regarding preferences and groupings for the prioritized search. Information based on organization of a user interface may be used to assist the client in automatically determining search priorities as well as predefined groupings and priorities. One possible user interface and how its organization may contribute to prioritization and groupings is discussed below with respect to FIGS. 5-6. Block 462 indicates that the client determines the search groups and search priorities. At block 464, a plurality of search requests are created. For example, one search request per search group may be created. Alternatively, two or more search groups may be combined into a search request however, in this embodiment there is a request per search group. In one example, an application associated with a client side browser may determine what (what information) and how (priority based on placement) a web browser at a particular client device is currently configured to display information to determine processing priorities and groupings. At block 466, the search processing may be performed iteratively by partitioning the global search into a plurality of discrete searches and initiating the plurality of discrete searches at a server side search engine. For example, the client may issue multiple requests with each request containing the id of its associated search group. These requests may be queued up and sent out in sequence, with the number of concurrently active requests kept to a maximum (e.g., two as shown below for FIG. 4F). This buffering and concurrency may be done to prevent the browser from dropping idle requests and to enable a search cancellation function. For example, if a new search is requested, all in-process requests may be cancelled and the request queue cleared. Note that the number of multiple requests issued by the client at any one time and the number of requests to run concurrently may be configurable based on capabilities of the infrastructure and desired performance, for example. Block 468 indicates that results for each search group are received at the client. Block 470 indicates that the client-side application may display results of each search group incrementally, as it receives them. Note that even though the requests are asynchronous and cannot be guaranteed to return from the server in any particular order, the client side processing may ensure that results are displayed consistently with search group priority. Block 472 indicates that an indication of overall progress may be presented at the client device along with iterative results to provide an indication of overall search progress. Aspects regarding display of information associated with the disclosed method 455 will be discussed in more detail below with reference to FIG. 5.

FIG. 4E illustrates method 475 of a one possible flow from the perspective of client device 315. Beginning at block 476 a search string and search space (e.g., the tables and areas to be searched) is received (e.g., at a browser of client device 315). Flow continues to block 478 where priorities of searching each search space are obtained. Next, at block 480 a search request for a first portion of a search space (e.g., search group 1) is sent for processing to a search engine. Note, the search space may include a table from a data base, a knowledge base, or other repository of information to be searched. At block 482, results from one of the discrete search requests are received at client device 315. Flow for results continues to block 490 where results are displayed while keeping priorities correct. That is, if the results are not for the next highest priority set to be displayed, they may be buffered to give time for another set of results having higher priority to be received and processed for display. Block 482 also allows flow for the search loop to continue to decision 484 where it is determined if the search is complete. If yes, flow continues to block 488 where search processing stops and final results are displayed at block 490, otherwise (NO prong of decision 484) flow continues to block 486 where the search request for the next highest priority item in the search space may be sent to the search engine. This iterative flow continues until all search space items are searched with results being returned at each priority transition and displayed as illustrated at block 490. FIG. 4F illustrates a timeline 495 indicating activity from each of the client perspective and the server perspective. Note that timeline 495 indicates that multiple search requests may be active concurrently (in this case two) and that search request three begins processing prior to search request two completing processing. In this example, the client side is responsible for displaying results while keeping priorities correct because search results may be returned in a different order than they were requested. While FIGS. 4A-C reflect processing primarily on the server side and FIGS. 4D-F reflect processing primarily on the client side, it is envisioned that the processing may be split between client and server side in any manner as a combination of these two embodiments.

Figure 5:
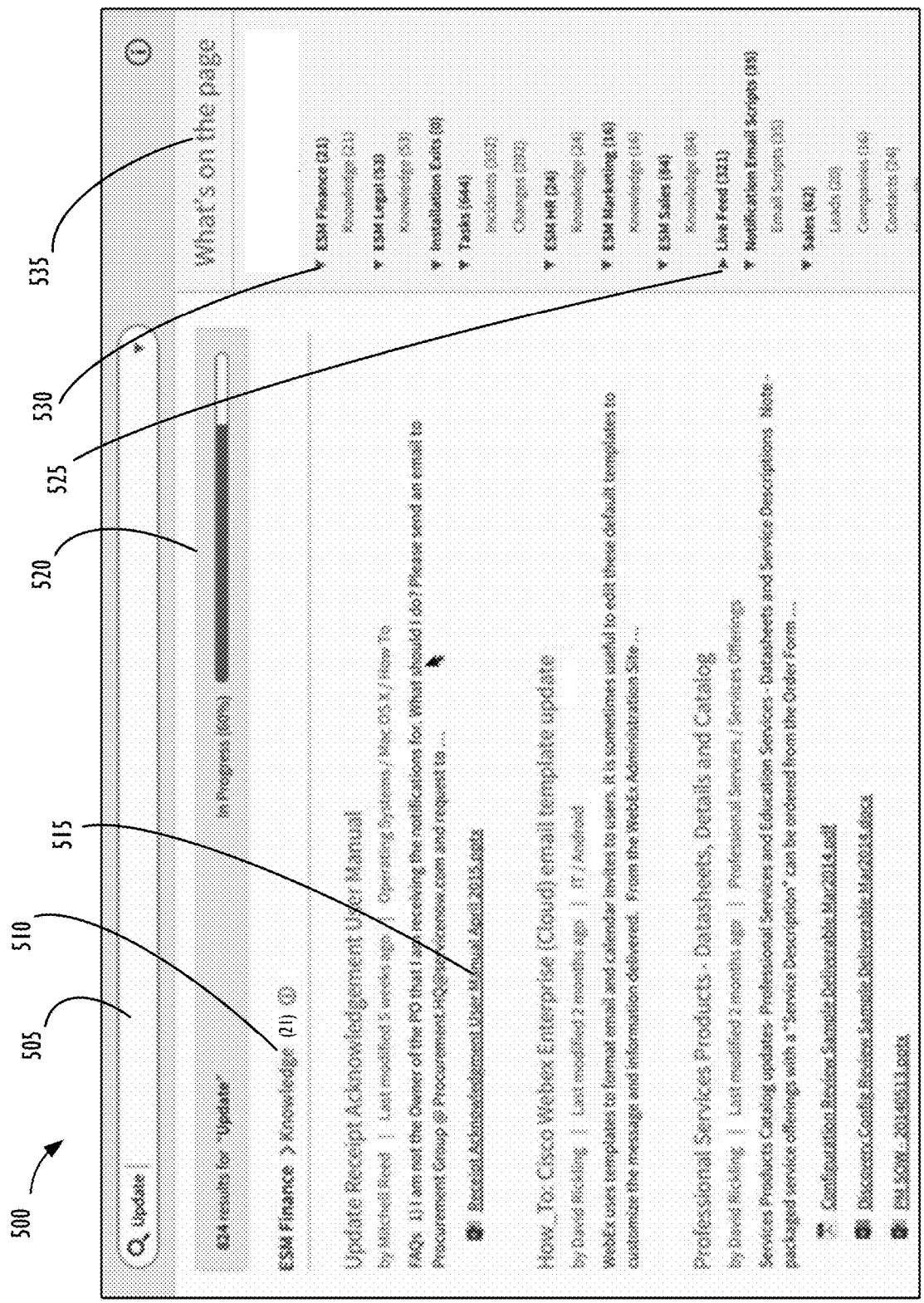
FIG. 5 illustrates a screen shot 500 of one possible user interface for a query results presentation and interaction panels according to one or more disclosed embodiments.

FIG. 5 illustrates a screen shot 500 of one possible user interface for a query results presentation and interaction panels according to one or more disclosed embodiments. At the top of screen shot 500 is one example of a search query entry field 505 which, in this example, is shown to be searching for the string "Update." Informational area 520 shows that there are currently 824 results for the query update which is at 60% completion as shown in the progress bar. This percentage completion may be configured to represent an estimation of the progress of the search to show the percentage of table groups searched or the percentage of overall data (e.g., based on size calculations of all data in all tables belonging to groups designated for this search) that has been searched. Other methods of calculating an estimated progress of the search are also possible. In this example embodiment, the progress bar provides information to a user that although results are available and already shown on the results page, the overall search is not completed and more results may be added to this results page. Note that because, in this embodiment, search results from higher priority table groups are shown at the top of the results page any additional results will be added to the end of the results already being display. Near the top of the page, element 510 informs the user that a search group named "ESM Finance" has a table referred to as "Knowledge" that has 34 matching entries. Element 515 represents an attachment to the document that is associated with the search results shown. On the right hand side of screen shot 500 there is a navigation area 535 configured to show "What's on the page." Navigation area 535, in this example, includes a listing of table groups, tables within each group, and metric(s) related to search results associated with the identified tables and table groups. In this example, the metric is a number to indicate the number of times the search string "Update" was found within each table or table group. In other cases, the metric may be indicated by font, color, special character, or other visual indicator to inform a user of, for example, a relevancy metric pertaining to the string match within that table or table group. Note that, in this example, results are shown based on table group priority so it is possible that more relevant matches may not be shown at the top of the search results. Accordingly, it may be desirable to provide an indication of relevancy with some sort of visual indication to assist the end-user. In navigation area 535 each of the table groups is expandable/collapsible as indicated by expanded indicator 530 and collapsed indicator 525. When expanded as shown near expanded indicator 530 each of the tables within the group are shown individually and when collapsed as shown at collapsed indicator 525 only the table group and a summation of matches for all tables within the table group is shown. Clearly, screen shot 500 is an example layout of a results page and other organizations of information pertaining to search results are possible.

Figure 6:
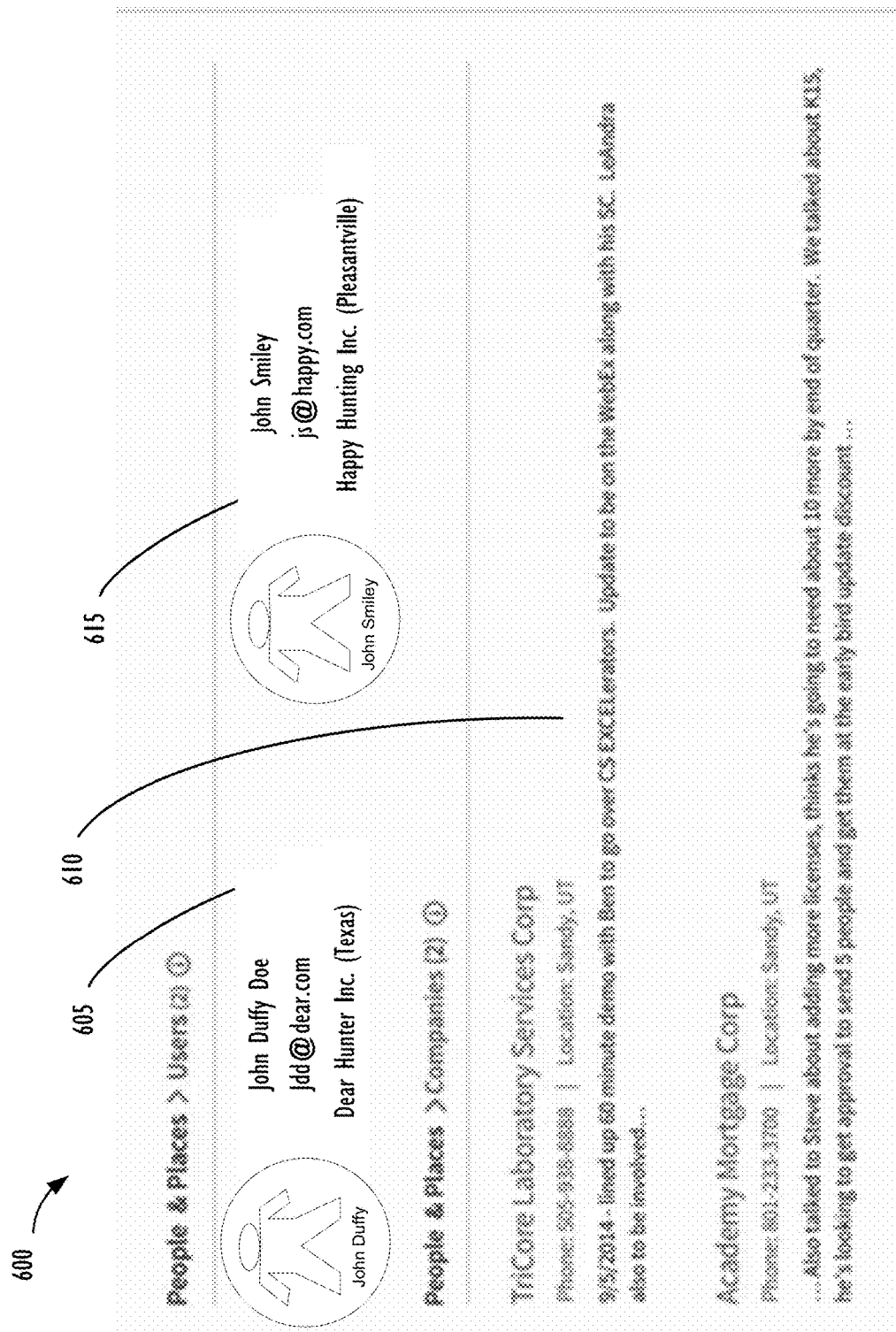
FIG. 6 illustrates a screen shot 600 of one portion of a possible user interface using customizable templates to assist in displaying results from certain tables in accordance with user defined criteria according to one or more disclosed embodiments.

FIG. 6 illustrates a screen shot 600 of one portion of a possible user interface using customizable templates to assist in displaying results from certain tables in accordance with user defined criteria according to one or more disclosed embodiments. User information sections 605 and 615 are shown in a format similar to how a contact may show up in a contact list as opposed to tabular result information as shown in element 610. This may be implemented by having customizable templates associated with particular tables within a search group (or for all tables within a search group) so that results are formatted to be aligned with the customizable template prior to display. Alignment with a template may be performed by the search engine prior to returning results or by processing of results at a client device prior to display to a user. As illustrated in screen shot 600, using customizable templates for certain types of data may assist in presentation of results in a more user-friendly manner within the context of the search results presentation methods of the one or more disclosed embodiments.

Figure 7:
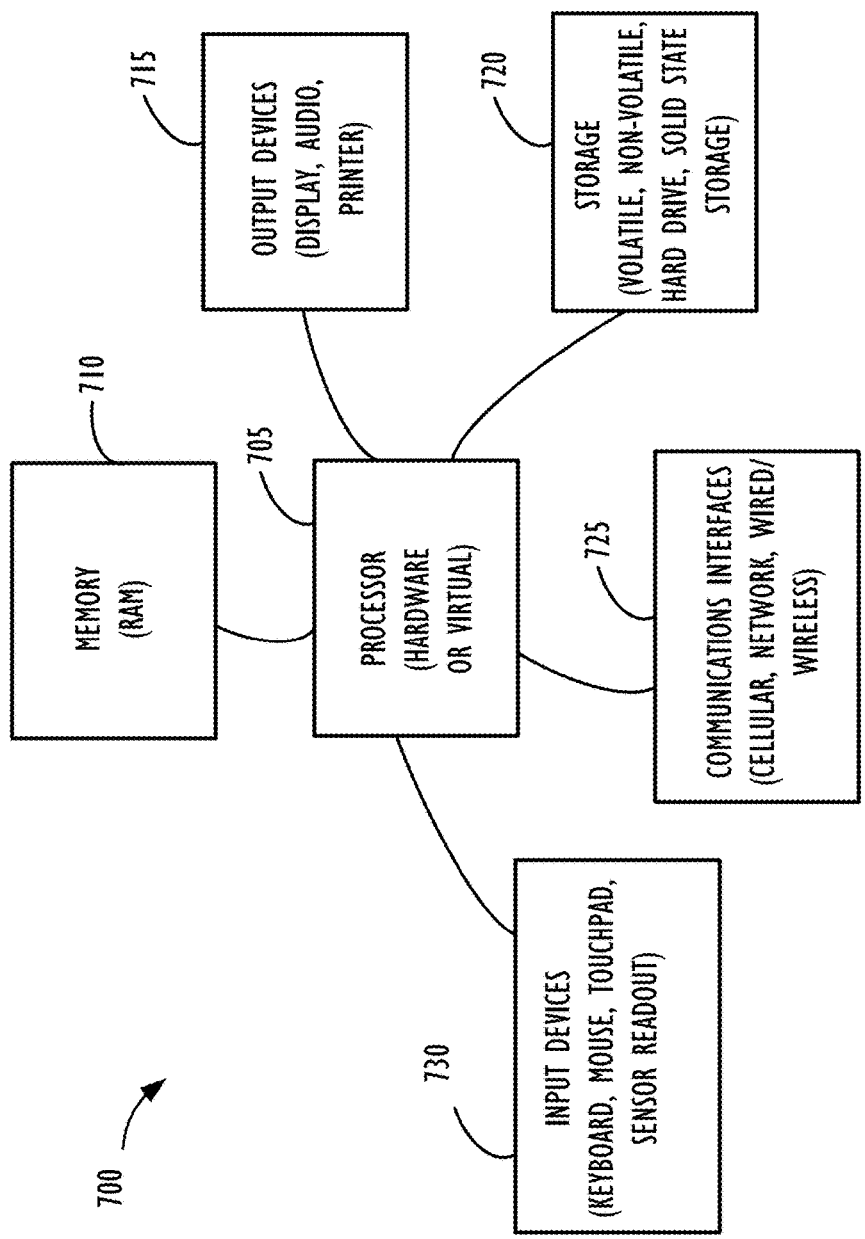
FIG. 7 illustrates a high-level block diagram 700 of a processing device (computing system) that may be used to implement one or more disclosed embodiments.

FIG. 7 illustrates a high-level block diagram 700 of a processing device (computing system) that may be used to implement one or more disclosed embodiments (e.g., service provider cloud infrastructure 110, client devices 104A-104E, server instances 112, data centers 206A-B, etc.). For example, computing device 700 illustrated in FIG. 7 could represent a client device or a physical server device and include either hardware or virtual processor(s) depending on the level of abstraction of the computing device. In some instances (without abstraction) computing device 700 and its elements as shown in FIG. 7 each relate to physical hardware and in some instances one, more, or all of the elements could be implemented using emulators or virtual machines as levels of abstraction. In any case, no matter how many levels of abstraction away from the physical hardware, computing device 700 at its lowest level may be implemented on physical hardware. As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display). Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 7, processing device 700 includes a processing element such as processor 705 that contains one or more hardware processors, where each hardware processor may have a single or multiple processor cores. In one embodiment, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 7, the processing elements that make up processor 705 may also include one or more other types of hardware processing components, such as graphics processing units (GPU), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more storage devices 720 that comprise a non-volatile storage device and/or volatile memory. Volatile memory, such as random access memory (RAM), can be any suitable non-permanent storage device. The non-volatile storage devices 720 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A client computer system, comprising:
    a memory partition;
    a user interface configured to receive from and present information to an end-user, the user interface communicatively coupled to one or more processing units; and
    a network interface communicatively coupled to the one or more processing units and the memory partition, wherein the memory partition comprises computer instructions that when executed by the one or more processing units cause the client computer system to:

execute a client application communicatively coupled, via the network interface, to a client instance executing in a cloud-based computer system;

receive a query request at the client application, the query request indicating a query string;

obtain information identifying a plurality of table groupings having a priority indication relative to each other;

create a plurality of search requests based on the obtained information, wherein the plurality of search requests are ordered based on the priority indication of the table groupings;

send a first portion of the plurality of search requests to the client instance;

receive a first portion of search results from the client instance, the first portion of search results representing information obtained from a completed search of all tables within a first table group based on the first portion of the plurality of search requests, the first table group having a priority at least equal to the highest priority of all table groups within the plurality of table groupings;

display, on the user interface, information pertaining to the first portion of search results;

send, after receiving the first portion of search results from the client instance, a second portion of the plurality of search requests to the client instance;

receive a second portion of search results from the client instance after display of the first portion of search results, the second portion of search results representing information obtained from a completed search of all tables within a second table group, the second table group having a priority lower than the priority of the first table group; and display, on the user interface, after display of the first portion of search results, information pertaining to the second portion of search results.

2. The client computer system of claim 1, wherein the query request comprises at least one of a search parameter or a search wildcard, the search parameter indicating a Boolean operator and string associated with the Boolean operator to apply as part of a searching function; and the search wildcard indicating a meta matching character to be used for matching the query string.

3. The client computer system of claim 1, wherein the computer instructions cause the client computer system to:
determine an indication of progress associated with the first or second portion of search results, the indication of progress representing an estimated amount of completion of the query request for all of the plurality of table groupings, the estimated amount of completion determined at the client instance; and
display, on the user interface, information pertaining to the indication of progress along with search results corresponding to the indication of progress.

4. The client computer system of claim 3, wherein the indication of progress comprises a percentage and the estimated completion is based on a total amount of data stored in all of the plurality of table groupings.

5. The client computer system of claim 1, wherein the computer instructions cause the client computer system to:
process the first portion of search results prior to displaying results to maintain an organization of priority and association of tables to table groupings when presented on the user interface.

6. The client computer system of claim 1, wherein the computer instructions cause the client computer system to:

obtain information about at least one display template associated with a table where a search result of the first portion of search results was obtained, the at least one display template comprising formatting information; and
process the first portion of search results prior to displaying results to utilize the at least one display template to format the search result when presented on the user interface.

7. The client computer system of claim 1, wherein the computer instructions cause the client computer system to:
display a navigation pane containing information about table groups and associated tables wherein table groups are displayed within the navigation pane in an order consistent with priority and received search results.

8. The client computer system of claim 7, wherein the navigation pane comprises expandable toggle indicators that when selected toggle between an expanded view and a collapsed view of tables within table groups.

9. The client computer system of claim 8, wherein the navigation pane comprises a count indicator associated with table groups and tables, the count indicator reflecting a number of search results associated with a corresponding table or table group.

10. The client computer system of claim 7, wherein the navigation pane comprises links such that selection of a table or table group from within the navigation pane causes the client computer system to reposition a view of search results consistent with the selection.

11. A system comprising:
a memory; and
one or more hardware processors communicatively coupled to the memory and configured to read and execute instructions from the memory to cause the one or more hardware processors to:
identify a query associated with an indication to perform a global search across a plurality of table groupings, the query originating at a global search user interface;
determine one or more search groups associated with search terms of the identified query and selected from the plurality of table groupings, each of the one or more search groups associated with a respective search group priority;
request a plurality of search iterations, wherein the plurality of search iterations are requested on the one or more search groups in order based on the respective search group priority associated with each of the one or more search groups;
receive results from a first of the plurality of search iterations for presentation in the global search user interface while subsequent iterations of the plurality of search iterations have not yet completed, wherein the results are iteratively presented in the global search user interface while continuing to process subsequent iterations of the plurality of search iterations; and
receive results from a second of the plurality of search iterations for presentation in the global search user interface while subsequent iterations of the plurality of search iterations have not yet completed.

12. The system of claim 11, wherein the query comprises at least one of a search parameter or a search wildcard, the search parameter indicating a Boolean operator and string associated with the Boolean operator to apply as part of a searching function; and the search wildcard indicating a meta matching character to be used for matching the query.

13. A cloud-based computer system, comprising:
a memory partition; and
a network interface communicatively coupled to one or more processing units and the memory partition, wherein the memory partition comprises computer instructions that when executed by the one or more processing units cause the cloud-based computer system to:
receive a query request, via the network interface, from a client application, the query request indicating a query string;
determine a plurality of table groupings, each table grouping having a relative priority amongst the plurality of table groupings, the plurality of table groupings associated with a client instance, the client instance executing in the cloud-based computer system and communicatively coupled to the client application;
obtain results, using a search engine configured to execute in the client instance, of a first search from a first of the plurality of table groupings, the search based on the query string, the first of the plurality of table groupings having a higher priority than any other of the plurality of table groupings not yet searched; and
send, via the network interface and to the client application, at least a portion of the obtained results of the first search prior to sending results of a second search from a second of the plurality of table groupings, wherein the at least a portion of the obtained results are configured to be displayed on an interface prior to display of the results of the second search.

14. The cloud-based computer system of claim 13, wherein the query request comprises at least one of a search parameter or a search wildcard, the search parameter indicating a Boolean operator and string associated with the Boolean operator to apply as part of a searching function; and the search wildcard indicating a meta matching character to be used for matching the query string.

15. The cloud-based computer system of claim 13, wherein the computer instructions cause the cloud-based computer system to:
calculate a representation of progress indicating an amount of completion relative to an estimated completion of the query request being processed for all of the plurality of table groupings; and
send an indication of the representation of progress to the client application.

16. The cloud-based computer system of claim 15, wherein the representation of progress comprises a percentage and the estimated completion is based on a total amount of data stored in all of the plurality of table groupings.

17. The cloud-based computer system of claim 13, wherein the computer instructions to cause the cloud-based computer system to determine the plurality of table groupings comprise instructions to cause the cloud-based computer system to determine the plurality of table groupings based upon table groupings automatically defined, at least in part, by using previous query requests or results of previous query requests.

18. The cloud-based computer system of claim 13, wherein the at least a portion of the obtained results sent to the client application comprise information about organization of and priority of the plurality of table groupings sufficient to allow the client application to present a view of search results that maintains an association of results to tables and individual table groups from which the obtained results were found.

19. The cloud-based computer system of claim 13, wherein the at least a portion of the obtained results sent to the client application comprise at least one display template associated with a table where a search result was obtained, the at least one display template comprising formatting information sufficient to allow the client application to present a view of the search result based on the formatting information.

20. The cloud-based computer system of claim 13, wherein tables within a table group of the plurality of table groupings comprise at least two of: a table in a relational database, a knowledge base, a problem resolution database, an indexed data set, a flat file database.

* * * * *

UNITED STATES PATENT AND TRADEMARK OFFICE
CERTIFICATE OF CORRECTION

PATENT NO. : 10,956,435 B2
APPLICATION NO. : 15/588427
DATED : March 23, 2021
INVENTOR(S) : Scott Kaufmann, Christopher Tucker and Andreas Kirn Page 1 of 1

It is certified that error appears in the above-identified patent and that said Letters Patent is hereby corrected as shown below:

On the Title Page

Item (12), should read:
Kaufmann et al.

Item (72) Inventors, should read:
(72) Inventors: Scott Kaufmann, San Diego, CA (US);
Christopher Tucker, San Diego, CA (US);
Andreas Kirn, San Diego, CA (US)

Signed and Sealed this
Twenty-seventh Day of September, 2022

Katherine Kelly Vidal
*Director of the United States Patent and Trademark Office*